(12) United States Patent
Cheramie

(10) Patent No.: US 7,134,151 B1
(45) Date of Patent: Nov. 14, 2006

(54) TOILET TRANSPORT DEVICE AND METHOD TO USE

(76) Inventor: George J. Cheramie, 39 Gene Gunter Rd., Deville, LA (US) 71328

( * ) Notice: Subject to any disclaimer, the term of this patent is extended or adjusted under 35 U.S.C. 154(b) by 180 days.

(21) Appl. No.: 11/043,558

(22) Filed: Jan. 26, 2005

(51) Int. Cl.
*A47K 17/00* (2006.01)
*B60P 1/10* (2006.01)

(52) U.S. Cl. ............................. 4/661; 254/7 R; 269/17; 414/460

(58) Field of Classification Search ............... 254/7 R, 254/7 B, 8 R; 4/661; 269/17; 414/460
See application file for complete search history.

(56) References Cited

U.S. PATENT DOCUMENTS

| D184,343 | S | 2/1959 | Durbin |
| 3,391,905 | A * | 7/1968 | Burns .................. 254/7 R |
| 5,203,065 | A | 4/1993 | Peters |
| 5,373,593 | A | 12/1994 | Decky et al. |
| 5,505,430 | A | 4/1996 | Barnett |
| 5,556,076 | A | 9/1996 | Jacquay |
| 6,015,137 | A | 1/2000 | Guevara |
| 6,685,170 | B1 | 2/2004 | Gwynn |

\* cited by examiner

*Primary Examiner*—Tuan Nguyen
(74) *Attorney, Agent, or Firm*—Lawrence J. Gibney, Jr.

(57) ABSTRACT

This is a device to easily and safely transport a toilet, which can be broken down and folded for easy storage and transport. It has very few mechanical parts and uses the existing toilet set holes to safely lift a toilet.

7 Claims, 3 Drawing Sheets

TOILET TRANSPORT DEVICE AND METHOD TO USE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

This relates to the safe transportation of a toilet. Specifically, the device will assist an individual to move a toilet safely from a truck inside a home or business so that the toilet may be installed. The device may also be used to lift a toilet to change the wax ring, which is part of every toilet.

B. Prior Art

There are many other devices, which can transport toilets. Respresentive examples of these devices are Geuvara, U.S. Pat. No. 6,015,137 and Gwynn U.S. Pat. No. 6,685,170.

One of the potential drawbacks of the Gwynn device is that the toilet may actually drop because it is suspended by ropes and hoists. The Geuvara patent uses a strap mechanism, which is controlled by a crank and pulley system and is substantially different than the current mechanism.

BRIEF SUMMARY OF THE INVENTION

In order to safely transport a toilet, which can be quite heavy and cumbersome, from the truck to the home or business it should be done in a safe and deliberate fashion. One of the goals in transporting a toilet is to minimize the risk of injury to the worker or installer and prevent damage to the toilet.

This particular device uses a frame, which allows the toilet to be elevated slightly off the ground-approximately three to four inches. A set of wheels, which are secured to the frame allow for the device to traverse all types of terrains while maintaining the position of the toilet off the ground.

The device can be folded and easily stored if it is not being used. Additionally the device does not use any outside machines to elevate the toilet to a safe distance above the ground.

The device uses a lifting member, which is joined to the toilet using the existing holes in the toilet, which are used for the toilet seat. A rod lifts the lifting member and this in turn lifts the toilet off the ground no more than three to four inches.

It is anticipated that the device will be made from aluminum or steel. The type of construction material would be durable yet not difficult to transport.

DETAILED DESCRIPTION OF THE EMBODIMENTS

In order to safely transport a toilet from, for instance, a truck to the bathroom it should be done safely and done without risk of injury to the worker or the toilet. Toilets usually weight at least fifty pounds and can sometimes weigh as much as one hundred pounds.

Figure 3:
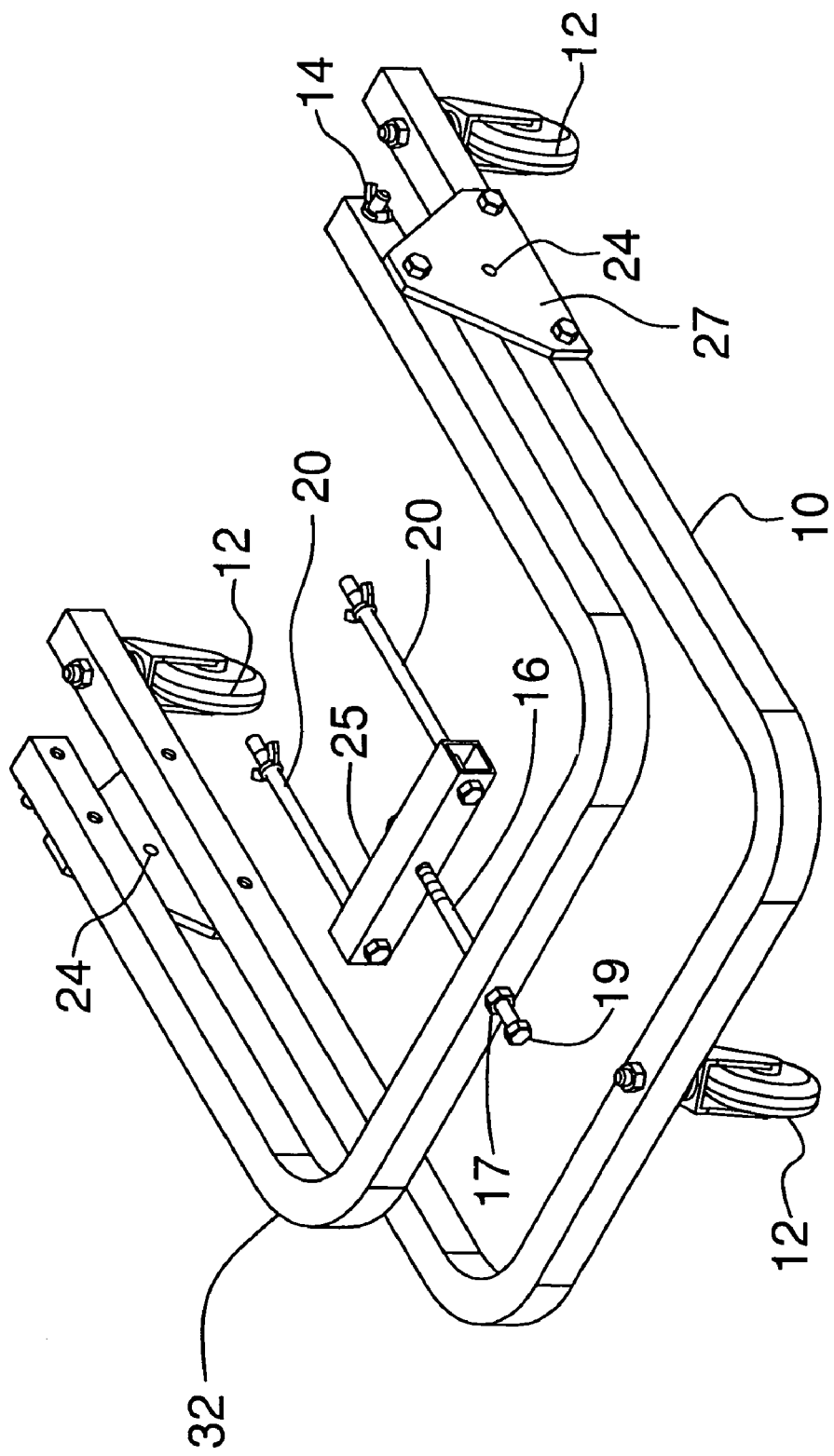
FIG. 3 is a view of the frame in the folded position.

This device, which can be easily folded such as depicted in FIG. 3, consists of two sets of frame members: a lower frame member 10 and an upper frame member 32. The lower frame member 10 and upper frame member 32 are separate pieces. When the device is stored the lower frame member 10 and the upper frame member 32 are roughly parallel to each other and are formed into the shape of a U when the item is to be stored or transported. FIG. 3 Wheels 12 are attached to the underside of the lower frame member 10 to allow easy transport of the toilet after it has been elevated off the ground. The specific type of wheel 12 may vary depending on the terrain to be traversed. Although three wheels are shown, it may be necessary to use four wheels, which would be placed on the respective corners of the lower frame member 10.

The device does not employ any outside machinery or ropes, pulleys or hoists to achieve the intended result. Instead, the device uses the existing set of holes on every toilet, which are used to install the toilet seat. Every toilet is equipped with toilet seat holes and the holes are located behind the toilet and in front of the tank 5 that holds the water. FIG. 11*n* any standard toilet there are two toilet seat holes.

Figure 1:
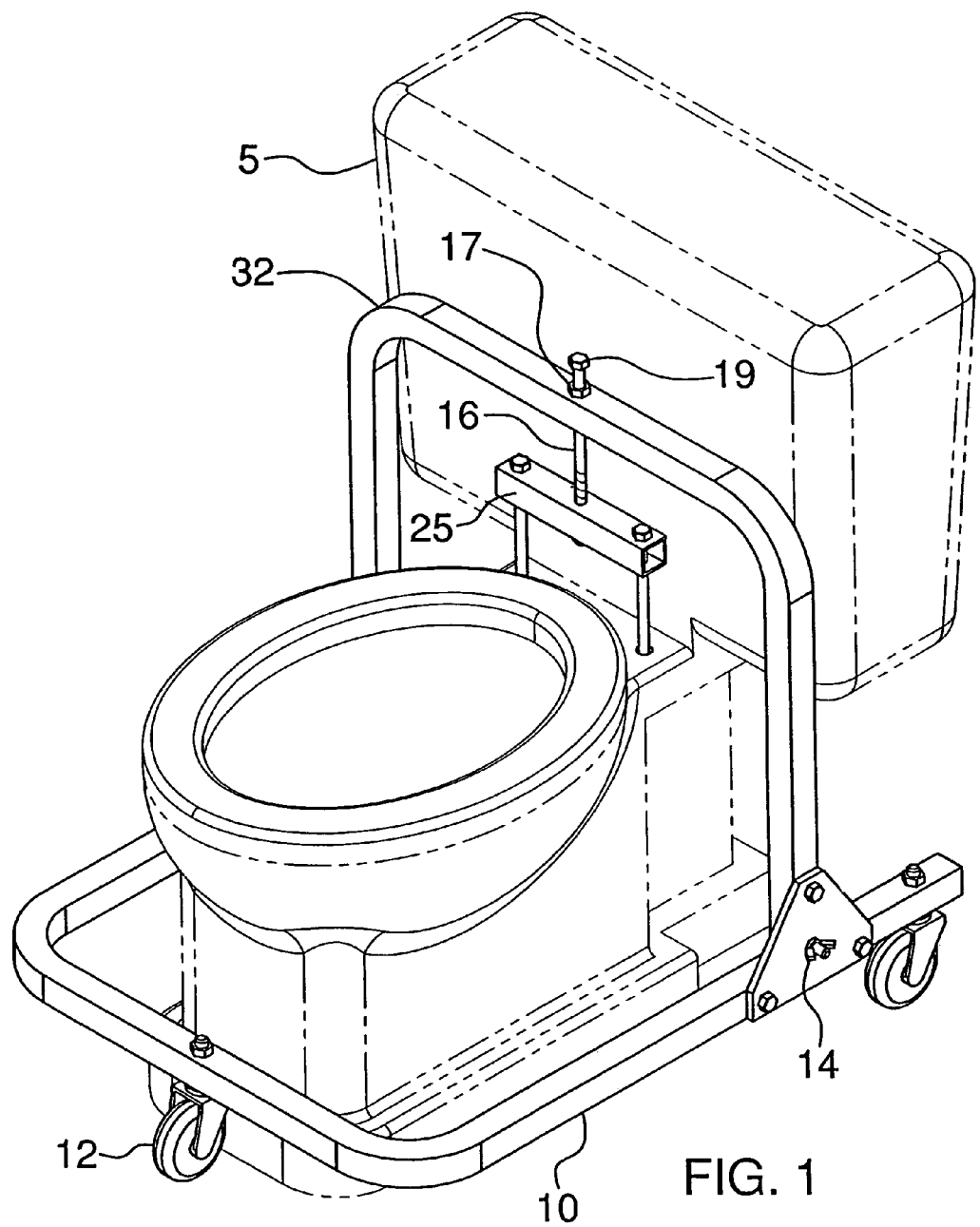
FIG. 1 is a perspective view of the device.

The two toilet seat bolts 20 are inserted through corresponding holes in a lifting member 25 and inserted through the toilet seat holes on the toilet. FIG. 1,2,3 Each toilet seat bolt 20 has a first end and a second end. Each of the toilet seat bolts 20 is inserted through a hole in the lifting member 25 provided for that purpose. There are two through holes on the lifting member 25 on opposite ends of the lifting member 25 for that purpose. FIG. 1,3

Figure 2:
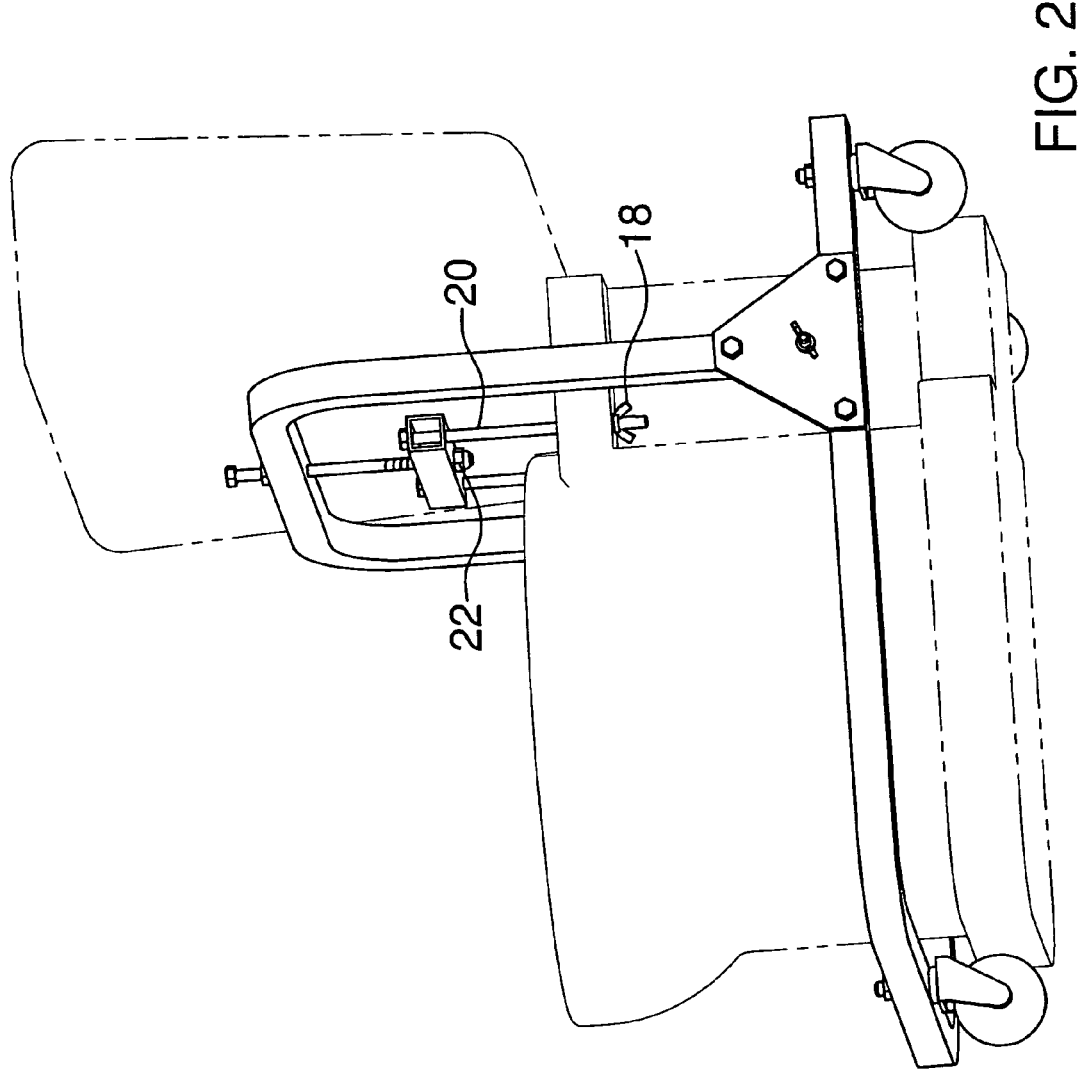
FIG. 2 is a side view of the device.

The toilet seat bolt 20 will be secured to the lifting member 25 and the respective toilet seat hole. An example of a means to secure the toilet seat bolt is a wing nut 18 as depicted in FIG. 2. Other means to secure the toilet seat bolt may include a cotter pin assembly, snap hook assembly or similar device. The means to secure the toilet seat bolts 20 will be used to secure the toilet in place when this device is used. The wing nut 18 is placed on one end of the toilet seat bolts 20 on the underside of the toilet seat hole and secured to the toilet seat bolt 20.

A lifting member 25 is provided to lift the toilet off the ground. The lifting member 25 has a lifting bolt 16 inserted through the middle of it and the two toilet seat bolts 20 are inserted through holes on opposite ends of the lifting member 25. A hole in the upper frame member 32 allows the lifting member 25 to be secured to the device. The lifting bolt 16 has a first end and a second end. On the first end is a means to turn 19 the lifting bolt; the lifting bolt is allowed to rotate once it is installed. On the second end is a means to secure the lifting bolt 16 to the lifting member 25; this means to secure may be a lock nut 22 as depicted in FIG. 2. Other means to secure may include a wing nut or cotter pin.

Additionally the lifting bolt is threaded so that a means can be provided to secure the lifting bolt 16 in place once the device is installed; this means to secure the lifting bolt 16 is provided so that when the lifting bolt 16 is turned it will lift the lifting member 25 and prevent the lifting bolt 16 from merely rotating in place. Because the lifting bolt is threaded, the placement of a bolt in a predetermined part of the lifting bolt on the top side of the upper frame member 32 would accomplish that purpose. FIG. 1

A lock nut 22 is provided on one end of the lifting bolt 16 to secure the lifting bolt 16 to the lifting member 25. FIG. 1,2,3 When the lifting bolt 16 is turned in a certain direction it raises the lifting member 25, which in turn will lift the toilet off the ground by the toilet seat bolts 20. When the lifting bolt 16 is rotated in the opposite direction, the toilet is lowered. It is anticipated that the means to turn the lifting bolt 16 could be accomplished with a power drill and a socket. An alternative means to turn the lifting bolt 16 may also include a handle.

The frame 10 consists of two sets of tubular members, which form the general shape of a U on the bottom when stored. The upper frame member 32 is connected to the lower frame member 10 by an attachment bracket 27. The attachment bracket 27 connects the lower frame member 10 to the upper frame member 32. The upper frame member 32 can be rotated so that it is roughly perpendicular to the lower frame member 10 prior to use. It is secured by inserting a means to secure 14 the upper frame member 32 by a through hole 24 in the approximate middle of the attachment bracket 27. The attachment bracket 27 is secured to both the upper and lower frame members. FIG. 1,2,3 Examples of the means to secure 14 the upper frame member 32 include a nut and bolt or bolt with wing nut as depicted in FIG. 1.

When the toilet is lifted it is inserted in the space, which is formed when the top frame member 32 is secured in a roughly perpendicular position relative to the lower frame member 10. It is anticipated that the device will be constructed from aluminum or steel in order to safely lift a toilet that may weigh as much as one hundred pounds but yet be light enough to be transported easily.

Wheels 12 are provided on the underside of the bottom frame member 10 to allow for easy transport across all terrains. Although three wheels are shown, four wheels may also be used. The specific type of wheel to be used may depend on the terrain.

In operation the upper frame member 32 is placed roughly perpendicular to the lower frame member 10 and secured with the attachment bracket 27 and the means to secure 14. The toilet seat bolts 20 are then inserted through the appropriate holes in the lifting member 25 and through the toilet seat holes, which are provided on every toilet, and secured to the toilet using the means to secure the toilet seat bolts 18. The lifting bolt 16 is placed through the upper frame member 25 and secured to the lifting member 22. In normal operation there is no reason to remove the lifting bolt 16, lifting member 25 and toilet seat bolts 20 from the device. An electric drill or cordless drill with the appropriate socket is placed over the means to turn 19 the lifting bolt 16. As the drill rotates the first end of the lifting bolt 16, the toilet will move in a generally vertical fashion. The toilet is lowered or raised by simply reversing the direction of the drill.

The invention claimed is:

1. A device for transporting toilets, which is comprised of:
   a. an upper frame member;
   b. a lower frame member;
   c. an attachment bracket;
   b. wheels;
   c. a lifting member;
   d. a lifting bolt;
   e. toilet seat bolts;
   g. means to secure the lifting bolt;
   h. means to secure the toilet seat bolt;
   wherein the upper frame member is connected to the lower frame member by the attachment bracket;
   wherein a through hole is provided in the attachment bracket to secure the upper frame member to the lower frame member when in use;
   wherein a means to secure the device at the attachment bracket is provided;
   wherein a hole in the top frame member secures the lifting member to the device;
   wherein the lifting bolt is inserted through the hole in the upper frame member provided for that purpose;
   wherein the lifting bolt is inserted through a hole in the lifting member;
   wherein a plurality of toilet seat bolts are installed through corresponding holes in the lifting member and through toilet seat holes;
   wherein a means to secure the toilet seat bolts to the toilet is provided;
   wherein a means to secure the lifting bolt to the lifting member is provided;
   wherein the wheels are installed on the lower frame member to allow transport across all terrains.

2. The means to secure the lifting bolt to the lifting member as described in claim 1 is a lock nut.

3. The means to secure the lifting bolt to the lifting member as described in claim 1 is a cotter pin.

4. The means to secure the toilet seat bolt as described in claim 1 is a wing nut.

5. The means to secure the toilet seat bolt as described in claim 1 is a cotter pin.

6. The means to secure the device at the attachment bracket as described in claim 1 is a bolt and wing nut.

7. A method to lift and transport a toilet using the device as described in claim 1, which is comprised of the following steps:
   a. rotating the upper frame members and securing the sides of the upper frame members to the lower frame member at the attachment bracket;
   b. inserting the lifting bolt through the upper frame member;
   c. securing the lifting bolt in place;
   d. inserting the lifting bolts through the toilet seat holes;
   e. securing the lifting bolt to the lifting member;
   f. rotating one end of the lifting bolt to elevate the toilet.

* * * * *